United States Patent
Weinberg et al.

(10) Patent No.: US 6,797,134 B2
(45) Date of Patent: Sep. 28, 2004

(54) PULSED POWER SUPPLY FOR ELECTROCHEMICAL CELL

(75) Inventors: Norman L. Weinberg, East Amherst, NY (US); Klaus Tomantschger, Mississauga (CA); Robert S. Feldstein, Pelham Manor, NY (US); J. David Genders, Marilla, NY (US); Joseph M. Rait, Buffalo, NY (US)

(73) Assignee: Lectro Press, Inc., Buffalo, NY (US)

( * ) Notice: Subject to any disclaimer, the term of this patent is extended or adjusted under 35 U.S.C. 154(b) by 0 days.

(21) Appl. No.: 10/643,345

(22) Filed: Aug. 19, 2003

(65) Prior Publication Data

US 2004/0084326 A1 May 6, 2004

Related U.S. Application Data

(60) Division of application No. 08/334,952, filed on Nov. 7, 1994, now Pat. No. 6,638,413, which is a continuation-in-part of application No. 07/894,099, filed on Jun. 5, 1992, now abandoned, which is a continuation-in-part of application No. 07/419,371, filed on Oct. 10, 1989, now abandoned.

(51) Int. Cl.[7] ................................................. C25B 9/04

(52) U.S. Cl. ................................ 204/229.5; 204/229.7; 204/230.6; 204/230.8; 307/106

(58) Field of Search .......................... 204/229.5, 229.7, 204/230.6, 230.8; 307/106

(56) References Cited

U.S. PATENT DOCUMENTS 6,638,413 B1 * 10/2003 Weinberg et al. ........... 205/637

* cited by examiner

*Primary Examiner*—Arun S. Phasge
(74) *Attorney, Agent, or Firm*—Howard M. Ellis (57) ABSTRACT

A method and apparatus are provided for electrolyzing water for enhanced production of oxygen, hydrogen and heat by the steps of (i) providing an electrochemical cell comprising an isotopic hydrogen storage cathode, an electrically conductive anode and an ionically conducting electrolyte comprising water, and (ii) impressing a repeating sequence of voltages across the cathode and anode comprised of at least two cell voltage regimes, a first cell voltage regime consisting of a voltage sufficient to enhance cathodic absorption of hydrogen, and a second cell voltage regime consisting of at least one voltage pulse which is at least two times the voltage of the first cell voltage regime for a total duration no greater than 0.10 seconds.

19 Claims, 4 Drawing Sheets

PULSED POWER SUPPLY FOR ELECTROCHEMICAL CELL

CROSS REFERENCE TO RELATED APPLICATIONS

This application is a division of continuation-in-part application Ser. No. 08/334,952, filed Nov. 7, 1994 now U.S. Pat. No. 6,638,413, which is a continuation-in-part of application Ser. No. 07/894,099, filed Jun. 5, 1992, abandoned, which is a continuation-in-part of application Ser. No. 07/419,371, filed Oct. 10, 1989, abandoned.

TECHNICAL FIELD

This invention relates generally to the electrolysis of water, and more specifically, to improved methods and apparatus for the production of oxygen, hydrogen and heat by electrolyzing water.

BACKGROUND OF THE INVENTION

Hydrogen gas is very important for hydrogenation of chemical compounds, in semiconductor fabrication and in ammonia synthesis, to name but a few uses. It is frequently produced by separating carbon monoxide and hydrogen resulting from high-temperature gasification of coal, or from petroleum products. However, this hydrogen is not sufficiently pure for many applications.

High purity hydrogen is needed in the food industry to produce margarines, for example. Pure oxygen is important in life support systems in hospitals, submarines, space vehicles, and so on. Electrolysis methods are generally recognized for providing high purity products, and water electrolysis methods in particularly are useful in yielding hydrogen and oxygen of sufficient purity for such applications.

Methods for the electrolysis of water are known. One representative electrolytic cell configuration for electrolysis of water would comprise an anode (+) and cathode (+) separated by a physical barrier, e.g., porous diaphragm comprised of asbestos, microporous separator of polytetrafluoroethylene (PTFE), and the like. An aqueous electrolyte containing a small amount of ionically conducting acid or base fills the anode and cathode compartments of the cell. With application of a voltage across the electrodes hydrogen gas is formed at the cathode and oxygen is generated at the anode.

Heretofore, methods of electrolyzing water have had several disadvantages. For example, anodes can form oxides which can passivate with some metals. Cathodes can deposit contaminants like metals, organic residues and particulates, thereby coating, passivating or even changing their electrocatalytic behavior. The bubble size of evolved gases too can be such as to blanket the electrodes with an almost insulating film. These effects lead to higher capital and operating costs due to higher cell voltages, as well as losses in current efficiency.

Most processes for electrolyzing water have failed to increase reaction temperatures or generate sufficient heat especially at the electrodes to effectively increase rates of chemical reactions in or at the electrodes, for anode or cathode cleaning, assist in minimizing gas blanketing effects, or enhance the incorporation and storage of hydrogen in cathodes in facilitating the formation of useful metal hydrides, for instance. Because of the above shortcomings, processes for electrolyzing water have not always been conducted under the most economical conditions, for example, at higher current densities.

Accordingly, there is a need for improved methods and apparatus for electrolysis of water which are capable of enhancing the generation of oxygen, hydrogen and heat.

SUMMARY OF THE INVENTION

In accordance with the invention an improved method is provided for electrolyzing water for enhanced production of oxygen, hydrogen and heat by the steps of:
(i) providing an electrochemical cell comprising an isotopic hydrogen storage cathode, an electrically conductive anode and an ionically conducting electrolyte comprising water, and
(ii) impressing a repeating sequence of voltages across the cathode and anode comprised of at least two cell voltage regimes, a first cell voltage regime consisting of a voltage sufficient to enhance cathodic absorption of hydrogen, and a second cell voltage regime consisting of at least one voltage pulse which is at least 2 times the voltage of the first cell voltage regime for a total duration of no greater than 0.10 seconds.

More particularly, the voltage of the first cell voltage regime will range from about 1 to about 10 volts, and the voltage pulse of the second cell voltage regime will range from 2 times to 1,000 times the voltage of the first cell voltage regime wherein the total duration of the voltage pulse ranges from about 0.5 nanoseconds to 0.10 seconds.

For purposes of this invention "hydrogen", which is produced by the cathode and also absorbed by the cathode, is intended to include ordinary hydrogen ($H_2$), and its isotopes, such as $D_2$, $T_2$, HD, HT; $H^-$, $D^-$, T and their metal hydrides; H•, D• and T•. The term "water" as appearing in the specification and claims is intended to include ordinary water ($H_2O$), deuterium oxide ($D_2O$), tritium oxide$_2$ (T 0) and mixtures thereof. Thus, the electrolyte of the foregoing method may comprise in addition to an ionic compound, a solvent selected from water ($H_2O$), deuterium oxide, tritium oxide and mixtures of the same. The ionic compound may include metallic compounds or metal oxycompounds, such as metal oxydeuterides, metal oxytriterides, metal hydroxides and mixtures thereof.

The expression "total duration" for purposes of this invention is intended to include all the time elements of a particular voltage pulse, including rise time, time at or near maximum voltage and fall time.

The term "enhanced" or "enhancing" as appearing in the specification and claims relative to the production of oxygen, hydrogen and heat is intended to mean optimizing or maximizing their production consistent with achieving the highest economical and practical current efficiency and current density for the generation of oxygen and hydrogen with the simultaneous production of sufficient heat to foster their production.

The methods include steps wherein, for example, the sequences of voltages reciprocate between the first and second voltage regimes, including regimes wherein the second cell voltage regime is dovetailed onto the first cell voltage regime.

It is still a further object of the invention to provide improved methods for the electrolysis of water for enhanced production of oxygen, hydrogen and heat, wherein a repeating sequence of voltages includes the step of applying a positive potential sufficient for cleaning the electrodes, which then may be followed, for instance, with the step of applying a negative potential for further cathodic absorption of hydrogen. That is to say, a cathode potential of −0.10 to about −3 volts and a current density of at least 1.0 mA/cm$^3$ of cathode surface area.

In accordance with the invention it is still a further object to provide for an apparatus for electrolyzing water for the enhanced production of hydrogen, oxygen and heat, which comprises:

(i) an electrochemical cell having an isotopic hydrogen storage cathode, an electrically conductive anode and a compartment for holding an ionically conducting electrolyte comprising water, and (ii) means for applying to the cathode and the anode at least two alternating voltage regimes, a first cell voltage regime consisting of a voltage ranging from about 1 to about 10 volts, and a second cell voltage regime consisting of at least one voltage pulse ranging from 2 times to 1,000 times the voltage of the first cell voltage regime, the total duration of the voltage pulse ranging from about 0.5 nanoseconds to 0.10 seconds.

It is also a further object to provide a pulsed drive system for an electrochemical cell, which comprises means for providing a train of timing pulses, means for counting and decoding the timing pulses, and means for generating alternating pulsed potential sequences across an anode and a cathode of the cell at predetermined times in response to the counted and decoded pulses.

BRIEF DESCRIPTION OP THE DRAWINGS

For a further understanding of the invention and its characterizing features reference is now made to the accompanying drawings wherein.

DESCRIPTION OF THE PREFERRED EMBODIMENTS

In electrolyzing water according to the methods of this invention to produce useful products like hydrogen, oxygen and heat, a unique sequence of pulsed voltages is applied to an electrochemical cell equipped with electrodes consisting of an isotopic hydrogen storage cathode (−), typically palladium; an inert, electrically conductive anode (+) wherein the electrodes are immersed in an aqueous electrolyte solution comprising isotopic hydrogen.

As the name implies, isotopic hydrogen refers to the isotopes of hydrogen, namely deuterium and tritium, but also $H_2$ HD, HT; $H^-$, $D^-$, $T^-$ and their metal hydrides; H•, D• and T•. Naturally occurring hydrogen contains about 0.0156 percent of deuterium and minute amounts of tritium. Deuterium oxide is commercially available. For example, referring to the 1988–1989 Aldrich Chemical company, Inc., catalogue, 940 West Saint Paul Ave., Milwaukee, Wis., deuterium oxide is available as reagent 19,170-1.

An isotopic hydrogen storage cathode is an electrically conductive electrode which is capable of being filled or saturated with hydrogen, i.e., the molecules $H_2$, $D_2$, $T_2$, HD, HT, the anions $H^-$, $D^-$, $T^-$ and their metal hydrides, and the atoms H•, D• and T•. Representative examples of isotopic hydrogen storage cathodes are those comprised of palladium, palladium alloys, doped palladium, palladium deposited onto carbon, silica or titanium; compositions of palladium/samarium, compositions of palladium/ruthenium, compositions of palladium/silver, nickel, nickel alloys and mixtures thereof. These and other cathodes may be fabricated with internal or external piping with a suitable stable heat transfer medium, such as low temperature molten salt. Other cathode designs are also possible. Thus, by way of further illustration, one may employ a Dewar type cell with a palladium cathode rod having a diameter of 6.35 mm. Such a rod is available from Johnson Matthey/AESAR Group, 892 Lafayette Road, Seabrook, N.H., and is listed as catalogue no. 12557 (1989–1990 AESAR catalogue).

In each case, it is one objective of the invention to provide a cathode which is capable of increased loading or absorption of isotopic hydrogen by the structure with application of the first of a sequence of at least two cell voltage regimes, the first cell voltage regime having a low voltage of long duration relative to that of the second cell voltage regime.

The performance of any particular isotopic hydrogen storage cathode under conditions of operation may be evaluated by methods known to persons skilled in the art, and published in the literature. For example, in determining how much hydrogen is stored in a palladium cathode one may dissolve samples of the palladium in an aqua regia solution closed distillation system. The solvent is distilled out into a collection vessel. Standard electroanalytical methods may be used to determine the amount of hydrogen in the electrode.

Anodes employed in the process are inert and electrically conductive, and may be comprised of elemental materials, oxides and alloys typically of platinum, rhodium, ruthenium, palladium, gold, platinum on titanium, platinum on substoichiometric oxides of titanium like $Ti_4O_7$ available under the trademark Ebonex, iridium oxide on titanium or graphite; vitreous carbon, steel, nickel, nickel alloys, stainless steel, tantalum, and so on.

Anodes may also be gas diffusion type, such as the designs employed in fuel cells in which isotopic hydrogen is fed with the production of $H^+$, $D^+$ or $T^+$ species. One representative example of a gas diffusion anode is disclosed by U.S. Pat. No. 4,501,803, the disclosure of which is incorporated-by-reference herein. Gas diffusion anodes are of particular importance. Isotopic hydrogen from an external source or that produced at the cathode can be fed to the gas diffusion anode where the isotopic hydrogen is converted to solvate $H^+$, $D^+$ and $T^+$ species, depending on the feed stream, enabling generation of these ionic species at far lower potentials than that required by anodic discharge of $H_2O$, HDO, $D_2O$, DTO or $T_2O$.

The invention also contemplates an isotopic hydrogen gas diffusion anode being used with an oxygen depolarized gas diffusion cathode in an external electrochemical fuel cell to produce isotopic water, as well as substantial portion of the electrical energy required for operating the electrochemical cell for the electrolysis of water described herein. Gas diffusion, fuel cell-type oxygen depolarized cathodes are well known to those skilled in the art and are described in such representative patents as U.S. Pat. Nos. 4,313,813; 4,292,197; 4,244,793 and 4,191,618, the disclosures of which are incorporated-by-reference herein.

As previously discussed, the electrolyte employed in the electrolysis methods of the invention comprise water as the solvent with an ionically conductive material. The term "water" means not only ordinary water ($H_2O$), but also deuterium oxide ($D_2O$), tritium oxide ($T_2O$) and mixtures thereof. In addition to water as the primary solvent, the electrolyte may also include methanol, ethanol, sulfuric acid, methanesulfonic acid, nitric acid, mixtures of HCl, organic acids like acetic acid, etc. Other representative examples include $CD_3OD$, $CH_3OD$, $D_2SO_4$, DCl, $DNO_3$, $T_3PO_4$, $CD_3SO_3H$, and so on. Thus, the electrolyte may comprise mixtures of solvents, such as isotopic water, isotopic organic solvents and isotopic amines. In one preferred embodiment, the solvent is an oxide consisting of heavy water/deuterium oxide ($D_2O$), tritium oxide ($T_2O$), a mixed tritium/deuterium oxide (DTO), and mixtures of the same.

The electrolyte, in addition to containing the aqueous component, i.e., water, heavy water, tritium oxide, and so on, should also contain an ionic component, if not otherwise present, in a sufficient amount to provide at least 0.01 molar concentration. Preferably, the concentration of the ionically conductive component is at least about 0.3 molar, and even more preferably, at least about 1.0 molar. Representative examples of ionically conductive materials include in addition to metal oxy-compounds, such as metal oxydeuterides, metal oxytriterides, metal hydroxides, like LiOD, LiOT, NaOD, NaOH and so on, the electrolyte may contain soluble salts, both inorganic and organic types, such as neutral salts. Representative inorganic salts include sodium or potassium chloride, sodium sulfate, quaternary ammonium hydroxides, etc.

It is preferred that the conductivity of the electrolyte solvent and/or the solvent/ionically conductive agent solution be at least about 0.0001 $ohm^4 cm^{-1}$. A sufficient amount of the ionically conductive agent can be added to the electrolyte to attain the desired degree of conductivity, if necessary. Most preferably, the conductivity of the electrolyte be at least about 0.01 $ohm^{-1} cm^{-1}$. Those skilled in the art will well appreciate conductivity of the electrolyte solution can be measured by a standard conductivity meter.

While operating temperatures of the electrochemical cell and electrolyte can vary from above the freezing point to the boiling point of the medium, the operating temperature is preferably selected to maximize extraction of heat. Higher operating temperatures of greater than 25° C. up to the boiling point of the system are preferred. The boiling point may be increased by operating the cell under higher pressure and/or use of molten salts. Higher pressures than atmospheric may also be desirable with some cathodes like titanium, nickel and their alloys, and with carbonaceous cathodes.

In one embodiment, electrolysis of water may be conducted under supercritical or near supercritical conditions. At or near temperatures of the supercritical point of heavy water, intermolecular isotopic hydrogen bonding and supporting electrolyte solubility is minimized, and the dielectric constant for the electrolyte medium drops to very low values compared to operating conditions under more conventional temperatures and pressures. The high pressure enabling supercritical operation may be achievable in a closed electrochemical cell design using the above mentioned solvents which anodically generate gases like carbon dioxide or nitrogen. Supercritical conditions are typically in the temperature range from about 300 to about 1000° C. and in the pressure range from about 10 to several hundred atmospheres, depending on the particular electrolyte solvent selected.

The electrochemical cell employed in practicing the invention may be either monopolar or bipolar type. Representative monopolar and bipolar cells are described in U.S. Pat. Nos. 4,923,582; 5,015,345; 4,439,297 and 4,602,984, the disclosures of which are incorporated-by-reference herein.

The interior of the electrochemical cell may be undivided or divided, the latter by means of a porous diaphragm or ion-exchange membrane to separate the catholyte from the anolyte compartments. This will reduce the hazard from explosive combinations of oxygen and hydrogen. Representative electrochemical cells equipped with diaphragms are disclosed by U.S. Pat. Nos. 4,921,587; 4,713,163 and 4,891,107, the disclosures of which are incorporated-by-reference herein. Electrochemical cells having ion-exchange membranes are disclosed by U.S. Pat. Nos. 4,968,393; 5,055,110; 5,047,126 and 5,039,382, the disclosures of which are incorporated-by-reference herein.

An alternative useful cell for the electrolysis of water according to this invention is the so called "solid polymer electrolyte" configuration wherein the anode may comprise a deposited layer of inert metal, metal oxide or carbon, with or without a noble metal catalyst deposited on an ion-exchange membrane. The anolyte may then be water without dissolved ionically conductive additives.

Methods of the invention for the electrolysis of water to produce hydrogen at the cathode, oxygen at the anode and heat provide for the application of electrical energy to the electrochemical cell consisting of two or more voltage regimes. The basic first cell voltage regime consisting of a generally low and protracted voltage pattern relative to the second cell voltage regime, is at least sufficient to enhance or increase absorption/filling of the cathode with hydrogen. That is, the invention provides an important new means for producing substantial transient packing of hydrogen, e.g., $H_2$, $D_2$, $T_2$; HD, HT; $H^-$, $D^-$, $T^-$ and their metal hydrides; H•, D• and T•, within the isotopic hydrogen storage cathode without producing large average energy densities. The hydrogen entity or entities collected in the cathode may depend on such factors as cathode material, current density, packing density, temperature, as well as other factors.

Thus, the first cell voltage regime includes applying a voltage of usually 10 volts or less, and more particularly, from about 1 to about 10 volts. This corresponds to a maximum applied cathode potential of less than −10.0 volts, as measured with reference to a reversible deuterium reference electrode ("RDRE"), and more preferably, a maximum applied cathode potential of less than about −5.0 volts, and even more particularly, an applied cathode potential ranging from about −0.1 to about −3.0 volts. This first cell voltage regime is preferably a steady state voltage, or a time varying voltage, such as square wave, saw tooth, sinusoidal, cycloidal, and the like; or intermittent voltages (gaps), or biphasic (polarity reversing), and combinations thereof.

It will be apparent to persons skilled in this art, when a biphasic voltage regime is employed, and when the polarity reverses, the cathode may become the anode for a time, and vice versa.

Various embodiments of the first cell voltage regime can be successfully used in practicing the invention. In one representative preferred embodiment, the maximum cell voltage of the first cell voltage regime is less than about 10 volts, with a steady-state (D.C.) cell voltage. In an alternative embodiment, the average voltage of the first cell voltage regime is less than about 10 volts and varies continuously.

The cathode current density produced by the first cell voltage regime is preferably at least about 1.0 $mA/cm^2$ of cathode surface area. The expression "cathode surface area" refers to the geometrical surface of the cathode.

A second cell voltage regime is subsequently applied to the cell wherein the hydrogen-containing cathode receives at least one high voltage pulse of short duration relative to the first cell voltage regime. Generally, the voltage pulse of the second cell voltage regime should be sufficient to effectuate a change in the potential at the cathode and bring about a compaction or compression of the hydrogen imbibed by the isotopic hydrogen storage cathode during the first cell voltage regime. The voltage pulse of the second cell voltage regime, generally is at least twice the voltage of the first cell voltage regime, previously described, for a total duration of no greater than 0.10 seconds. Total duration, as previously discussed includes all the time elements of a particular voltage pulse, and includes the rise time, time at or near maximum voltage, and fall time. Thus, the second cell voltage regime may have a total duration as brief as 0.5 nanoseconds to 0.10 seconds.

The second cell voltage regime can also be defined by an applied cathode potential going more negative than the applied cathode potential of the first cell voltage regime. For instance, the first cell voltage regime could have an applied cathode potential in the range of −0.10 to −3.0 volts vs RDRE, and upon initiating the second cell voltage regime the applied cathode potential could be −0.5 to about −4.0 volts.

The rise time for the second cell voltage regime is less than about 100 milliseconds. In another embodiment the rise time may be less than about 10 microseconds, and more preferably, less than about 2.0 microseconds.

Figure 1:
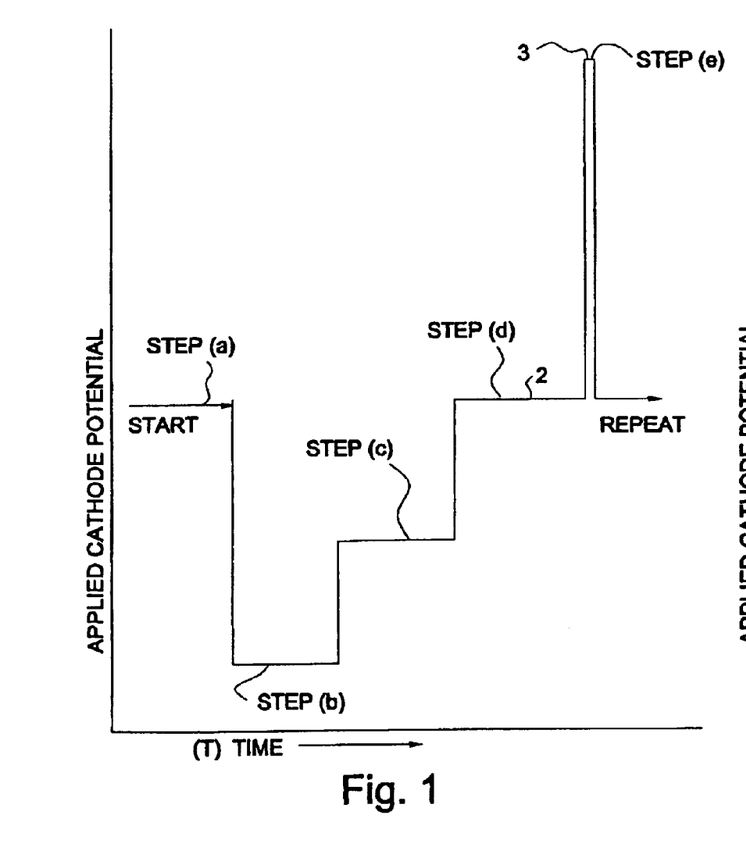
FIG. 1 is representative example of a first 15 applied square wave voltage regime in the electrolysis of water according to the present invention.

A representative applied cathode potential regime in the electrolysis of water according to the invention is illustrated by FIG. 1. Beginning with step (a) the cathode lattice is filled or packed with hydrogen, e.g., $H_2$, $D_2$, $T_2$; HD, HT; $H^-$, $D^-$, $T^-$ and their metal hydrides; $H^-$, $D^-$ and $T^-$ from the electrolyte. This is performed by the step of applying a relatively low negative potential sufficient to enhance absorption of the hydrogen by the cathode. Depending on the cathode, this will occur at a cell voltage of from about 1 to about 10 volts, which will generally correspond to a cathode potential from −0.10 to −3 volts, as measured by reference to a reversible deuterium reference electrode, and a cathode current density of 1 mA/cm$^2$, and more preferably, at a current density >50 mA/cm$^2$. The duration of this initial filling stage of the electrolysis process may run for a time period ranging from seconds to days, or even longer.

In step (b) of FIG. 1, by stepping the cathode potential to a low positive value, occasional cleaning of the electrode may be effectuated for removing surface contaminants and absorbed species to provide a clean or bare surface. This optional cleaning step may be performed over a time period ranging from milliseconds to seconds, or minutes, or longer. Optionally, the electrode potential may be changed to one of about the potential of zero charge as in step ĉ (resting period) to reequilibrate the electrode for a period on the order of seconds to minutes for purposes of maximizing absorption of hydrogen and other beneficial species, or desorption of contaminants.

In a fourth perturbation according to step (d), the potential of the cathode may then be stepped to the negative side for seconds to days, or even longer, for addition filling/absorption of the cathode with hydrogen and/or reduction of any surface oxide species remaining on the cathode.

In step (e) of FIG. 1, the second cell voltage regime previously discussed is imposed on the cell for a very short duration. For a period ranging from about 0.5 nanoseconds to 0.10 seconds, a high voltage pulse is applied. This pulse leads to an increase in cell voltage from about 2 to about 2000 times the voltage of the cathode filling voltage regime. Thus, the high cathode potential will be from about −0.50 volts to approximately −4.0 volts. The maximum applied cathode potential of the second cell voltage regime is measured from the base 2 of the first cell voltage regime to peak 3, which is the rise time, the latter being measured by standard means, such as by an oscilloscope.

Figure 2:
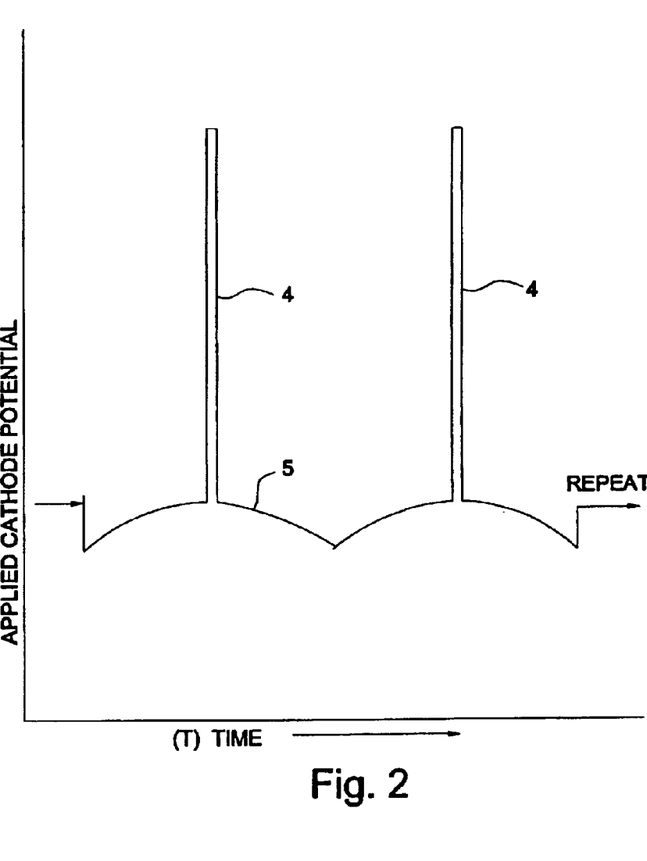
FIG. 2 is a representative example of a hemicircular pulsed regime of voltages in accordance with the invention.

FIG. 2 illustrates a further representative applied cathode potential regime useful in the electrolysis of water according to the invention wherein a short duration high potential pulse 4 is dovetailed onto a low voltage alternating current regime 5. Typically, wave forms can take a sinusoidal, triangular or square wave configuration, which may also include combinations of these, as well as asymmetric wave forms. It will be understood that many other potential wave forms are possible in practicing the methods of the invention. However, within the scope of the present invention the regimes and resulting wave forms comprise a relatively long duration, low cell voltage for filling the cathode, and a very short duration, high voltage pulse.

While not wishing to be held to any specific mechanism of action, it is nevertheless believed that the short duration, high pulsed voltage enhances hydrogen packing within the hydrogen filled cathode. This facilitates rates of any reactions in or at the electrodes, for example, due to localized electrode heating. When the voltage is spiked (step e), it is believed that the interatomic spacing between hydrogen species contained in the cathode lattice is decreased, perhaps by compression of the cathode lattice at particular sites without substantially increasing hydrogen transport in solution.

The short-duration pulses 4 (FIG. 2) can be applied intermittently, sequentially, or in repetitive bursts. In general, it is preferred that for every hour of time during which step (d) of the first cell regime is performed at least one second regime is applied.

The short duration potential pulses 4 can each have the same maximum voltage. Alternatively, they may have different maximum voltages.

Figure 3:
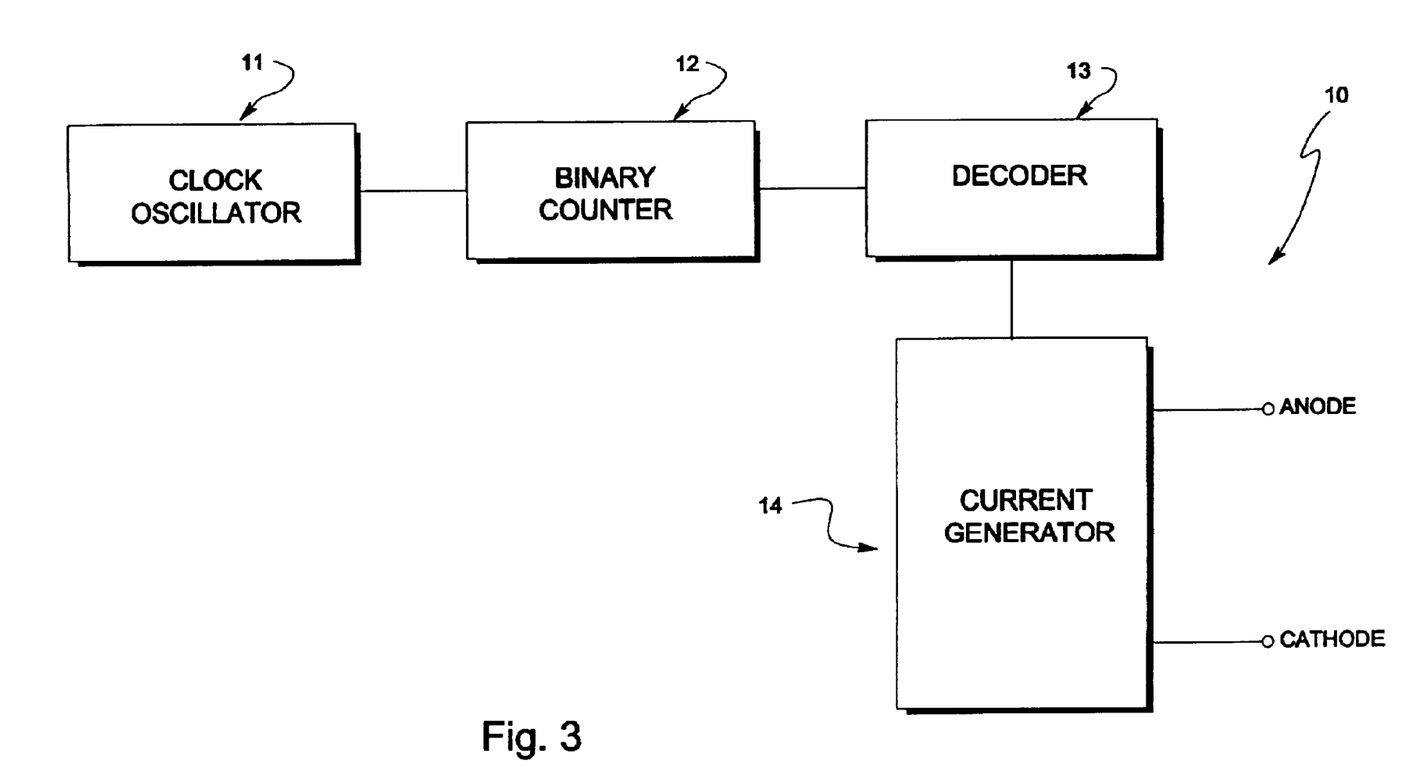
FIG. 3 is a block diagram of a pulsed drive system for the electrochemical cell of the invention.
Figure 4:
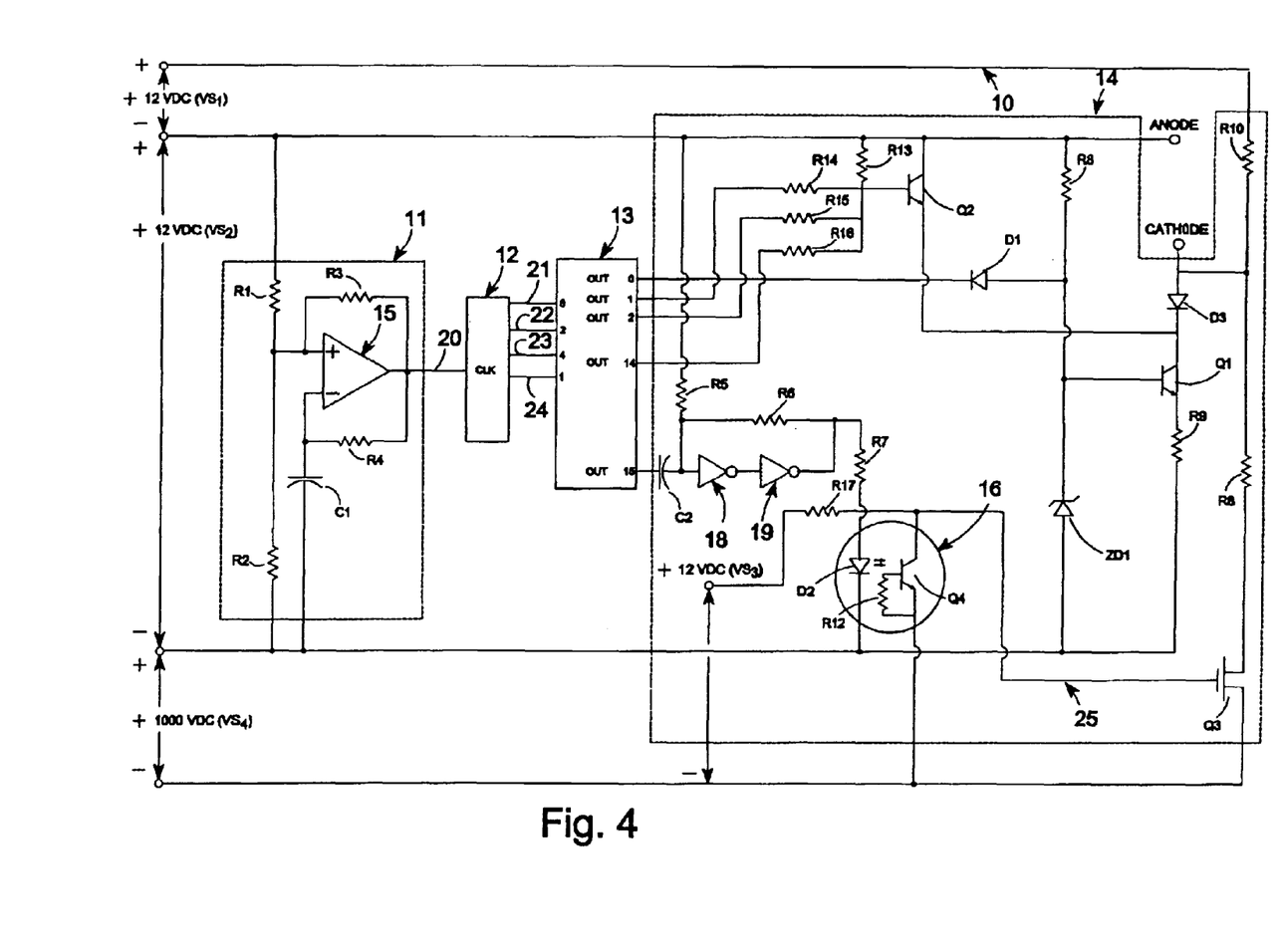
FIG. 4 is a detailed schematic circuit diagram of the pulsed drive system depicted in FIG. 3.

FIGS. 3 and 4 depict the apparatus of the present invention and particularly illustrate a feasible electronic circuit for providing the needed pulsed power drive which functions to electrolyze the aqueous electrolyte. It should be understood at the outset the circuit depicted in FIGS. 3–4 represents a preferred embodiment of the drive system presented as a best mode of practicing the invention. However, it will be readily apparent to one of ordinary skill in the art that circuit modifications can easily be made without departing from the spirit of the invention or from the scope of the appended claims. For example, FIG. 4 includes a clock oscillator utilizing an operational amplifier, but it is contemplated that other timing mechanisms could alternatively be employed, including, but not limited to multi-vibrators, unijunction pulse generators, or crystal controlled oscillators. Similarly, although integrated circuits are utilized for the binary counter and decoder, it is to be understood that variations in these aspects of the circuit could also be made, such as substitution of discrete elements (such as flip-flops, transistors, etc.) for the integrated circuits. Naturally, the function of the counter and decoder could also be provided by a microprocessor as well.

FIG. 3 illustrates in block form the elements of the pulse drive system 10 of the present invention. System 10 broadly includes clock oscillator 11 which provides a train of timing pulses to binary counter 12. Counter 12 counts the pulses, and decoder 13 reads or decodes the counted pulses and controls the timing sequence of current generator 14 (which provides the oscillating pulsed potentials to the anode and cathode of the electrochemical cell).

FIG. 4 is a detailed schematic diagram of the pulse drive system 10. system 10 includes four appropriate power supplies VS1, VS2, VS3 and VS4 (not shown), three of 12 volts direct current (VDC) and one of 1000 volts direct current.

Clock oscillator 11 includes operational amplifier 15 (301A or equivalent), resistors R1, R2, R3 and R4, and capacitor C1. Resistors R1, R2 and R3 are typically equal in value, and in a preferred embodiment are 47,000 ohms, providing an appropriate reference of ⅓ and ⅔ VS2 for the two halves of the oscillator circuit. The period of oscillation is approximately 1.2 times R4C1.

Oscillator 11 drives 4-bit binary counter 12 via line 20. In a preferred embodiment, counter 12 may include four successive bits of a model 4040B integrated circuit (or equivalent). The output of the four successive bits are communicated to decoder 13 via lines 21, 22, 23 and 24. Decoder 13 is a normally high decoder (4514B or equivalent), and provides 16 separate equal successive time interval outputs, labeled OUT0, OUT1, OUT3, . . . , OUT15 in FIG. 4. For simplicity, outputs OUT3 to OUT13 have been omitted from FIG. 4. If T=0 is defined as the "reverse" period, then when output OUT0 is low the base drive to Q1 (2N6282 or equivalent) of current generator 14 is removed and the cathode is driven in the reverse direction by the current through "reverse current resistor" R10.

During remaining "non-resting" time intervals, current generator 14 delivers a "forward" current. The magnitude of this forward current is determined by the reference voltage of Zener diode zD1 (1N5231B or equivalent) and feedback resistor R9. The cell current is actually the output at the current generator minus the current through R10 at the forward operating cell voltage.

As shown in FIG. 4, only T=0 is a reverse period. Clearly, the reverse period can be extended (e.g., T=0, T=1) or multiple reverse periods (e.g., T=0, T=4, etc.) can be provided, selectively connecting other outputs to the base of Q1 through diodes similar to D1.

At the leading edge of T=15, a Schmitt 5 trigger comprising buffers 18 and 19 (4049B or equivalent), and resistors R5 and R6, and capacitor C2, generates a pulse approximately 0.6C2R5 long. In a preferred embodiment this pulse is in the range of from about 0.1 to about 2.0 microseconds. The buffers function to provide isolation, voltage gain for Schmitt trigger, and current drive (through R7) to the emitter of optoisolator 16 (4N35 or equivalent). Optoisolator 16 includes internal LED D2, transistor Q4 and resistor R12.

Output 25 of optoisolator 16 is the bias switch for N-channel field-effect transistor (PET) Q3 (1000V 5N100 or equivalent). PET Q3 pulses the cell briefly in the forward during at approximately 1000 volts direct current (VDC). During this brief pulse, resistor R10 provides almost 100 times the current present during the remainder of the cycle, but the duration is short and power dissipation within acceptable limits. The current from R10 through FET Q3 is also well within the FET's switching capacity. Therefore, the cell is simply connected through R11 (a small limiter resistance) to 1000 VDC for the pulse duration.

During the pulse a high speed voltage diode D3 (MR-918 or equivalent) isolates Q1 from the cell. However, with the collector of Q1 isolated, only the current from R8 is available to R9 which is insufficient to maintain "normal" voltage and the voltage across ZD1 therefore collapses. Since D1 is reversed biased at this time, there is no effect on the circuit.

At the end of the pulse period normal forward current is reestablished across the cell for the remainder of T=15 prior to the T=0 "reverse" period. If this is not desired a diode (similar to D1) from output OUT15 to ZD1 will prevent this.

A "resting" period could obviously be introduced by shorting the Q1 collector to the anode when desired. This is shown simplistically in FIG. 4. PNP transistor Q2 (2N6285 or equivalent) driven by resistors R14, R15 and R16 from any of outputs OUT1–OUT14 will suffice for this purpose. Diodes similar to D1 could be added from the selected "resting" output(s) to turn off Q1 during rest.

In addition to the electrolysis of water to produce oxygen, hydrogen and heat, the methods of this invention are also useful in the electrochemical synthesis of other products. For example, at the anode of a membrane divided electrochemical cell it is possible to produce ozone, persulfate, chlorine, dichromate salts, ceric salts, as well as many other inorganic and organic products under reaction conditions familiar to those of ordinary skill in the art. Likewise, in the use of palladium based cathodes isotopic hydrogen products may be synthesized, such as $D_2$, DT, $T_2$, $D_2O_2$, $T_2O_2$, $ND_3$, $NDT_2$, $D_2S$, $PD_3$, $ND_4OD$, perdeuteromethanol, pertritioacetic acid, as well as many other isotopically labeled inorganic and organic products.

As will be apparent to those skilled in the art, during any time period it is desired to cause packing of the captive isotopic hydrogen in the cathode, one may superimpose the second cell voltage onto the first cell voltage regime. That is, instead of applying two discreet voltages to the cell, the invention contemplates the application a composite voltage regime which is the sum of the two voltages. It should be understood that when reference is made in the claims to a first cell voltage regime and a second cell voltage regime, such reference is also intended to include a composite voltage regime.

Alternative Means of Increasing Compression and/or Loading of Hydrogen in an Isotopic Hydrogen Storage Cathode As disclosed herein, the use of two voltage regimes provides very energetic conditions while requiring only modest average system energies. Thus, the desired loading of hydrogen in the isotopic hydrogen storage cathode is achieved without unduly taxing the system.

Other means may be employed for producing transient packing conditions of the cathode with hydrogen without unduly taxing the system.

In one embodiment, ultrasonic excitation of the electrolyte may be used additionally or alternatively. As used herein, the term "ultrasonic" refers to sound with a wavelength in the electrolyte which is relatively small compared to the maximum dimension of the container in which the electrolytic process is occurring. In general, in this method, the wavelength in liquid should be no greater than about 10 percent, and preferably no greater than 1 percent of the maximum dimension of the cell container.

As is known to those skilled in the art, the phenomenon of sonolumenescence is known to increase the local energy density at the walls of collapsing cavitation bubbles by many orders of magnitude. While the exact mechanism of concentration still remains under investigation, the optical output caused by sonolumenescence is proof of its effect. The rise in local energy density provides a mechanism for mechanically compressing both the lattice and/or hydrogen boundary layer if some of the bubbles form at or near the electrode surface.

By way of illustration, the local energy density may be increased by the use of a commercially available ultrasonic generator and bondable transducer to produce a wavelength in the liquid which is smaller than about 1.0 cm, and preferably smaller than about 0.5 cm. Thus, in this embodiment the frequency of the sound waves used will generally be greater than about 200 kilohertz and often will be greater than about 500 kilohertz.

The intensity of the sound waves used in this embodiment may be measured at the face of the transducer. This intensity, which is measured in watts/cm$^2$, will generally be at least 10 watts/cm$^2$. At and above this range of power, sonolumenescence will often occur.

One may use the sonic treatment instead of the second voltage regime comprised of short pulses. Alternatively, one may use the sonic treatment in addition to short pulse voltage regime, either subsequently or concurrently.

In one embodiment, the method of this invention is used to react an organic substrate with hydrogen, i.e., $H_2$, $D_2$, $T_2$; HD, HT; $H^-$, $D^-$, $T^-$ and their metal hydrides; H•, D• and T•. The isotopic hydrogen species are driven into the cathode lattice by the cell regimes of this process, and the reaction with isotopic hydrogen occurs at the surface of the cathode. Thus, the cathode acts as a large reservoir for these reactive species.

In another embodiment of the invention, the method is used to store hydrogen in the permeable cathode for later use.

One of the additional benefits of the invention is the application of the short, high potential pulses to clean the electrodes. The pulsing applied is thus beneficial for both the cathode and anode.

The invention also contemplates embodiments wherein the electrochemical cell is equipped with cationic permselective membrane, such as DuPont's Nafion® for separating the anode and cathode compartments. The anodic side is acidic, and the cathodic side of the membrane is basic.

The following specific example demonstrates the various aspects of the invention. However, it is to be understood that it is for illustrative purposes only, and does not purport to be wholly definitive as to conditions and scope.

EXAMPLE

Figure 5:
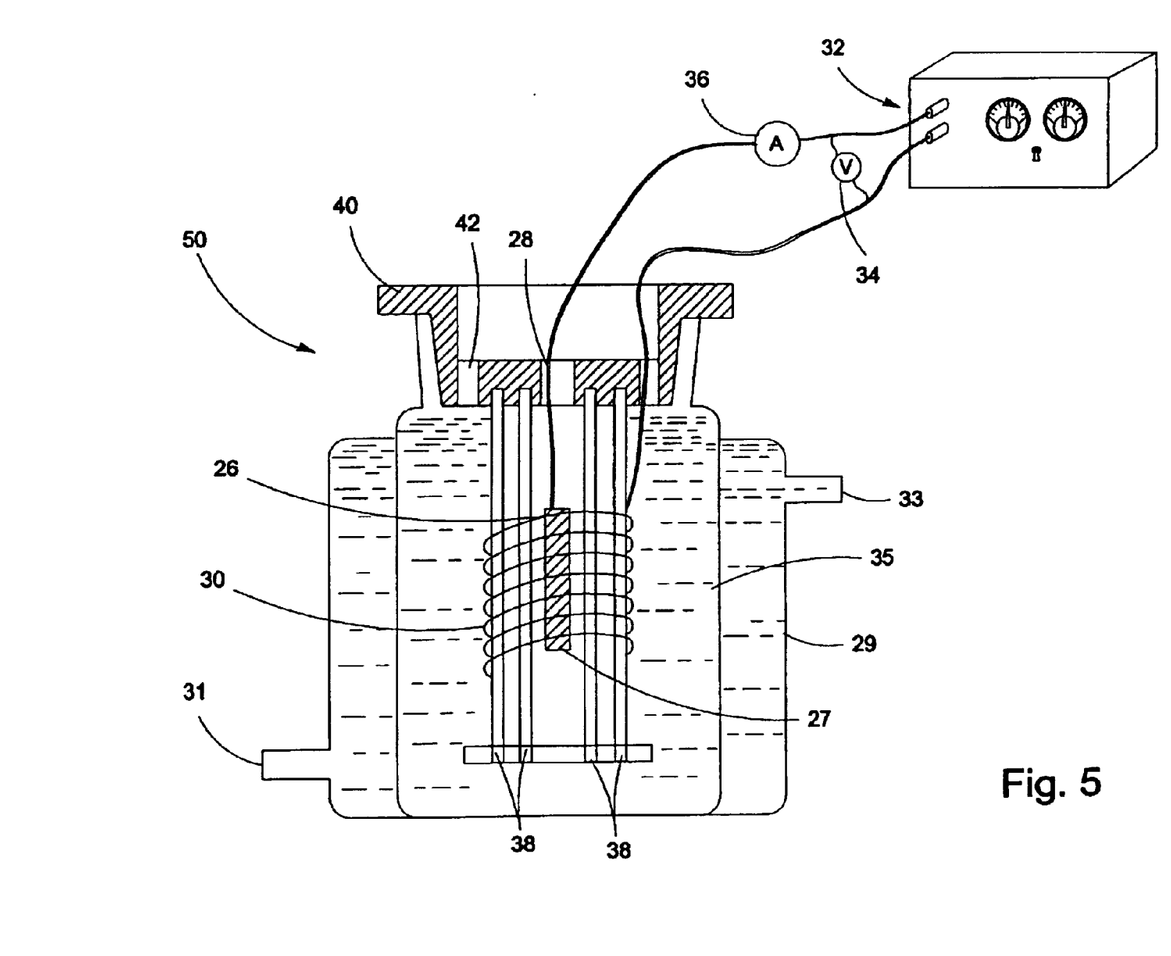
FIG. 5 is a diagrammatic view of an electrochemical cell and pulsed power supply for the electrolysis of water in generating oxygen, hydrogen and heat in accordance with the working example.

In order to demonstrate the invention a laboratory scale set-up having the folling description was assembled:

Referring to FIG. 5, there is shown an electrochemical cell assembly 50 consisting of a double wall jacketed type glass cell. The outer cooling jacket 29 included cooling water inlet and outlet ports 31 and 33, respectively. The undivided electrolyte compartment 35 was equipped with a series of centrally positioned insulating glass rods 18 spaced from one another. The cell cover 40 was a Teflon® cap fitted with a precision thermometer and thermocouple (not shown) mounted through vent openings 42. Glass rods 38 were fixedly mounted to cell cover 40. The cathode 26 consisted of a Johnson Matthey palladium wire (99.9 percent purity) having a diameter of 1 mm×4 cm length wound onto a glass insulator 27. The conductor for the cathode was suspended through a central vent opening 28 in the cell cover. The anode 30 was a 0.5 mm diameter platinum wire wound around insulating glass rods 38, and positioned symmetrically around palladium cathode 26. The electrolyte consisted of 65 ml of reagent grade 0.1M LiOD/$D_2O$. The entire cell assembly was kept in a constant temperature bath maintained at 20±0.1° C.

The power source for electrochemical cell 10 was an electronic pulsing device 32 fabricated by Scientific Prototype Manufacturing Co., Mespath, N.Y. Pulsing device 32 followed the basic circuit diagram of FIG. 4. The device was capable of superimposing a d.c. pulse of 40V on cell 50. The pulsing device provided a pulse width (pulse on-time) variable of 0.5 to 20 μsec and inter-pulse time (pulse off-time) between 30 and 1200 μsec. The instrument consisted of a 40V d.c. power supply, an F.E.T. switch to apply the 40V to the cell under test, was capable of delivering up to 100 A for these short durations, and a fast isolating diode to disconnect the normal electrolysis power supply during application of the pulse. Pulse width and interpulse time could be varied by means of continuously variable manual controls with actual cell operating parameters measurable externally by conventional laboratory equipment connected directly to the cell, i.e., voltmeter 34, ammeter 36, including a coulometer (not shown) and oscilloscope (not shown).

Electrolysis of the $D_2O$ solution was conducted first at a constant current of 0.1 A (current density of 80 mA/cm$^2$). The cell voltage during this stage remained very constant at 5±0.1V. Gases, $O_2$ and D2, were evolved at the anode and cathode, respectively. After about 40 hours of electrolysis the D/Pd ratio reached a value of 0.85.

At the D/Pd ratio of 0.85 the pulsar 32 was turned on at various settings of pulse width and interpulse time. Nine experiments were conducted with different pulse settings with each experiment lasting about 1.5 hours. At the conclusion of each experiment, electrolysis was stopped and the $D_2O$ solution allowed to return to its initial temperature of 20±0.1 C. At the conclusion of each experiment, any rise in $D_2O$ solution temperature was recorded, including the temperature change for a control experiment with no pulsing.

Table 1 below compares the increased temperature in the $D_2O$ solution, as well as average cell voltage and current, on constant current electrolysis with no pulsing, (control experiment #1) with superimposed pulsing under nine selected conditions of pulse width and interpulse time (experiments #2 and #10). In all experiments, $O_2$ and $D_2$ gases evolved at the anode and cathode, respectively. An increase in $D_2O$ solution temperature was observed in each experiment, including the control experiment.

The input power for the control experiment, (5.0V×0.10 A) is 50 watts, for a temperature increase (ΔT) of 48° C. For purposes of further calculations of relative heating effects in the pulsed experiments the assumption was made that the 0.50 watts input power of the control experiment is entirely the result of joule (IR) heating. Taking into account the duty cycle (DC) of the pulsed experiments, calculation of the relative percent excess heating is also shown in Table 1. It is seen that this relative excess heating compared to the control experiment depends heavily on selection of instrument settings of pulse width and interpulse time, rising from 0.0 percent at low pulse width to a maximum of 570 percent at 20 μsec pulse width and 525 μsec interpulse time. The calculated average excess heating over these nine pulsed experiments is 280 percent. An explanation for the surprising observation of excess heating in eight of the nine pulsed experiments is unavailable at this time.

TABLE 1

EXPERIMENTAL RESULTS IN PULSED D$_2$O ELECTROLYSIS

| Expt. # | Pulse Width μsec | Interpulse Time, μsec | Cell Volts, V | Current, A | T °C. | Excess Heating % |
|---|---|---|---|---|---|---|
| 1 (Control) | 0 | 0 | 5.0 | 0.10 | 0.48 | 0 |
| 2 | 1 | 1050 | 37.2 | 0.11 | 0.48 | 0.0 |
| 3 | 1 | 525 | 37.2 | 0.11 | 0.63 | 30 |
| 4 | 1 | 30 | 36.2 | 0.14 | 1.60 | 210 |
| 5 | 10 | 1050 | 36.1 | 0.13 | 1.80 | 250 |
| 6 | 10 | 525 | 35.4 | 0.15 | 2.76 | 380 |
| 7 | 10 | 30 | 25.8 | 0.80 | 22.50 | 320 |
| 8 | 20 | 1050 | 35.4 | 0.16 | 3.24 | 460 |
| 9 | 20 | 525 | 34.5 | 0.20 | 4.75 | 570 |
| 10 | 20 | 30 | 20.1 | 1.10 | 33.43 | 280 |

In summation, the example clearly demonstrated that O$_2$, D$_2$ and heat can be produced by pulsing in the short μsec region. Furthermore, unexplained excess heating occurs within selected pulse regimes, reaching maximum output of heat in particular pulse regimes. Such heat, while useful in economical performance of the electrolysis of water, can be recycled or removed for use in other production processes or in the generation of electricity.

While the invention has been described in conjunction with various embodiments, they are illustrative only. Accordingly, many alternatives, modifications and variations will be apparent to persons skilled in the art in light of the foregoing detailed description, and it is therefore intended to embrace all such alternatives and variations as to fall within the spirit and broad scope of the appended claims.

We claim:

1. A pulsed power supply for an electrochemical cell having an anode and a cathode, comprising means for generating a repeating sequence of voltages across said anode and said cathode, each said sequence including a first cell voltage regime consisting of a voltage sufficient to enhance cathodic absorption of hydrogen and a second voltage regime consisting of at least one voltage pulse which is at least two time the voltage of the first cell voltage regime in magnitude with a duration no greater than 0.10 seconds.

2. The pulsed power supply of claim 1 wherein the voltage of said first cell voltage regime ranges from about 1 to about 10 volts, and the voltage pulse of said second cell voltage regime ranges from 2 to 1000 times the voltage of said first cell voltage regime, and the total duration of said second voltage pulse ranges from about 0.5 nanoseconds to about 0.10 seconds.

3. The pulsed power supply of claim 2 wherein said pulsed power supply is operatively arranged to dovetail said second cell voltage regime onto said first cell voltage regime.

4. The pulsed power supply of claim 2 wherein pulsed power supply is operatively arranged to superimpose said second cell voltage regime onto said first cell voltage regime.

5. The pulsed power supply of claim 2 wherein pulsed power supply is operatively arranged to re-equilibrate the cathode in a region of zero potential.

6. The pulsed power supply of claim 1 wherein said pulsed power supply is operatively arranged to dovetail said second cell voltage regime onto said first cell voltage regime.

7. The pulsed power supply of claim 1 wherein said pulsed power supply is operatively arranged to superimpose said second cell voltage regime onto said first cell voltage regime.

8. The pulsed power supply of claim 1 wherein each said sequence further includes a positive voltage sufficient for cleaning said anode.

9. The pulsed power supply of claim 8 wherein said pulsed power supply is operatively arranged to apply a negative potential for further cathodic absorption of hydrogen.

10. The pulsed power supply of claim 1 wherein each said sequence further includes a positive voltage sufficient for cleaning said cathode.

11. The pulsed power supply of claim 10 wherein said pulsed power supply is operatively arranged to apply a negative potential for further cathodic absorption of hydrogen.

12. The pulsed power supply of claim 1 wherein said pulsed power supply is operatively arranged to re-equilibrate the cathode in a region of zero potential.

13. A pulsed power supply for an electrochemical cell having an anode and a cathode, comprising:

a triple power supply having a first low voltage direct current supply, a second low voltage direct current supply, and a third high voltage direct current supply;

an oscillator coupled to and powered by said second low voltage direct current supply, operatively arranged to provide a train of timing pulses;

a binary counter operatively arranged to receive said timing pulses from said oscillator;

a decoder coupled to said binary counter and operatively arranged to count said timing pulses; and, a current generator coupled to and controlled by said decoder, said current generator operatively arranged to provide oscillating pulsed potentials to said anode and said cathode.

14. The pulsed power supply recited in claim 13 wherein said oscillating pulsed potentials comprises a repeating sequence of voltages, each said sequence including a first cell voltage regime consisting of a voltage sufficient to enhance cathodic absorption of hydrogen and a second voltage regime consisting of at least one voltage pulse which is at least two time the voltage of the first cell voltage regime in magnitude with a duration no greater than 0.10 seconds.

15. The pulsed power supply recited in claim 14 wherein the voltage of said first cell voltage regime ranges from about 1 to about 10 volts, and the voltage pulse of said second cell voltage regime ranges from 2 to 1000 times the voltage of said first cell voltage regime, and the total duration of said second voltage pulse ranges from about 0.5 nanoseconds to about 0.10 seconds.

16. The pulsed power supply recited in claim 13 wherein said anode and cathode are connected via electronic switching circuitry to all three of said power supplies in order that oscillating potentials of varying polarity may be impressed across said anode and cathode over time.

17. The pulsed power supply recited in claim 13 wherein said first low voltage direct current power supply is a 12 Volt power supply.

18. The pulsed power supply recited in claim 13 wherein the second low voltage direct current power supply is a 12 Volt power supply.

19. The pulsed power supply recited in claim 13 wherein the third high voltage direct current power supply is a 1000 Volt power supply.

* * * * *